(12) United States Patent
Chen et al.

(10) Patent No.: US 7,233,602 B2
(45) Date of Patent: Jun. 19, 2007

(54) COORDINATION ARCHITECTURE FOR WIRELESS COMMUNICATION DEVICES USING MULTIPLE PROTOCOLS

(75) Inventors: Minghua Chen, Irvine, CA (US); Ping Liang, Irvine, CA (US)

(73) Assignee: Oxford Semiconductor, Inc., Milpitas, CA (US)

( * ) Notice: Subject to any disclaimer, the term of this patent is extended or adjusted under 35 U.S.C. 154(b) by 918 days.

(21) Appl. No.: 10/003,703

(22) Filed: Oct. 23, 2001

(65) Prior Publication Data

US 2002/0136233 A1 Sep. 26, 2002

Related U.S. Application Data

(60) Provisional application No. 60/278,458, filed on Mar. 22, 2001.

(51) Int. Cl.
H04L 12/56 (2006.01)
(52) U.S. Cl. .................................. 370/445; 370/338
(58) Field of Classification Search ............... 370/445, 370/338
See application file for complete search history.

(56) References Cited

U.S. PATENT DOCUMENTS

| 5,042,083 | A | * | 8/1991 | Ichikawa | ................... | 455/517 |
| 5,682,381 | A |   | 10/1997 | Sekihata et al. | | |
| 5,852,405 | A |   | 12/1998 | Yoneda | | |
| 6,278,693 | B1 | * | 8/2001 | Aldred et al. | ............... | 370/252 |
| 6,405,257 | B1 | * | 6/2002 | Gersht et al. | ............... | 709/235 |
| 6,600,726 | B1 | * | 7/2003 | Nevo et al. | ................. | 370/278 |
| 6,690,657 | B1 |   | 2/2004 | Lau et al. | | |
| 6,775,258 | B1 |   | 8/2004 | Van Valkenburg et al. | | |
| 2001/0010689 | A1 |   | 8/2001 | Awater et al. | | |
| 2002/0061031 | A1 | * | 5/2002 | Sugar et al. | ............... | 370/466 |
| 2002/0136184 | A1 |   | 9/2002 | Liang et al. | | |
| 2002/0136233 | A1 |   | 9/2002 | Chen et al. | | |
| 2002/0173272 | A1 |   | 11/2002 | Liang et al. | | |
| 2002/0191677 | A1 |   | 12/2002 | Chen et al. | | |
| 2003/0054827 | A1 |   | 3/2003 | Schmidt et al. | | |
| 2003/0058830 | A1 |   | 3/2003 | Schmidt | | |
| 2005/0078616 | A1 | * | 4/2005 | Nevo et al. | ................. | 370/278 |
| 2005/0130687 | A1 |   | 6/2005 | Flipovic et al. | | |

OTHER PUBLICATIONS

U.S. Appl. No. 60/238,761.

* cited by examiner

*Primary Examiner*—Derrick W. Ferris
(74) *Attorney, Agent, or Firm*—Knobbe, Martens, Olson & Bear, LLP

(57) ABSTRACT

A system and methods for coordinating transmissions in a wireless network wherein a plurality of frequency-overlapping protocols are used to exchange information between devices. In this system, a coordination point device integrates a monitoring functionality to identify impending data collisions between the frequency-overlapping protocols. The coordination point device further identifies quality of service parameters to determine if the protocols are operating within desirable ranges. Moderation one or more of the protocols is then performed to avoid data collisions arising from overlapping transmissions between the protocols while maintaining data throughput within acceptable ranges.

12 Claims, 10 Drawing Sheets

BLUETOOTH INTEGRATED
COORDINATION POINT

WLAN INTEGRATED
COORDINATION POINT

INTEGRATED
COORDINATION POINT

TRAFFIC BALANCING SCHEMA 210

| BASIC PRIORITY 215 | TRAFFIC TYPE 216 | SERVICE LEVEL 1 | | | SERVICE LEVEL 2 | | | CURRENT SERVICE | | |
|---|---|---|---|---|---|---|---|---|---|---|
| | | LOSS RATE 221 | DELAY (millisec) 225 | THROUGHPUT 226 | LOSS RATE 221 | DELAY (millisec) 225 | THROUGHPUT 226 | LOSS RATE 221 | DELAY (millisec) 225 | THROUGHPUT 226 |
| 1 | BT SCO | 1.00% | | | 2.50% | | | | | |
| 2 | BT ACL | | 50 | 90.00% | | 250 | 50.00% | | | |
| 3 | WLAN | | 50 | 60.00% | | | 10.00% | | | |

FIGURE 7

TRAFFIC COORDINATION INSTANCES FOR
BLUETOOTH / WLAN CONFIGURATIONS

| BLUETOOTH MASTER FUNCTIONALITY | BLUETOOTH SLAVE FUNCTIONALITY | WLAN FUNCTIONALITY | MODERATED PROTOCOL |
|---|---|---|---|
| NO | NO | YES | WLAN |
| YES | NO | YES | WLAN, BT SCO, BT ACL |
| NO | YES | YES | PARTIAL PARTIAL WLAN, BT SCO, BT ACL |

FIGURE 10

COORDINATION ARCHITECTURE FOR WIRELESS COMMUNICATION DEVICES USING MULTIPLE PROTOCOLS

CLAIM OF PRIORITY

This U.S. patent application claims priority to U.S. Provisional Patent Application No. 60/278,458, entitled "Collision Avoidance In Wireless Communication Devices" filed Mar. 22, 2001 which is hereby incorporated by reference. Additionally, this application incorporates by reference the following copending applications: Ser. No. 10/053,860 entitled "Collision Rectification In Wireless Communication Devices", Ser. No. 10/066,284 entitled "Coordination Architecture For Wireless Communication Devices Using Multiple Protocols", Ser. No. 10/106,515 entitled "Top-Level Controller For Wireless Communication Devices And Protocols", Ser. No. 10/211,976 entitled "Recognition Scheme For Moderating Wireless Protocols", and Ser. No. 10/211, 954 entitled "Remotely-Cooperative Scheduling Solution For Moderating Wireless Protocols".

BACKGROUND OF THE INVENTION

1. Field of the Invention

The present invention relates to wireless networking systems, and more particularly to a coexistive solution for frequency-overlapping wireless communication protocols.

2. Description of the Related Art

Wireless communication and networking protocols are increasingly used to provide connectivity for diverse classes of electronic devices. These wireless protocols permit electronic devices such as computers, personal digital assistants (PDA), and mobile phones to transmit and receive information without the requirement of physically interconnecting the electronic devices to one another or to communications mediums via wire or cable connections. Wireless connectivity in this manner increases portability and flexibility in electronic devices and has become an important method by which data and information is distributed.

Numerous standards have been proposed for use in transmitting and receiving information in wireless local area networks. Two emerging protocols which have received widespread acceptance include Bluetooth (BT) and IEEE 802.11 (WLAN) wireless protocols. These protocols share a common frequency spectrum in the 2.4-GHz Industrial, Scientific, and Medical (ISM) band and are used to exchange information between electronic devices which support the appropriate protocol. Both protocols offer high speed data exchange rates and may be integrated into devices for connecting to land-based or wired communications networks such as the Internet. In general, wireless protocols, such as BT and WLAN, transmit data by superimposing the desired information on a carrier radio wave. Data is recovered through the use of a receiver which specifically tunes to the transmission frequency of the carrier signal to receive the signal and decode the information contained therein.

The Bluetooth protocol is designed primarily for short-range wireless communication between electronic devices in small localized networks (piconets). The network topology in the Bluetooth piconet comprises up to eight active devices, with a maximum of three synchronous-connection-oriented (SCO) links. These SCO links further support real-time communications such as those required for voice or telephony applications. The Bluetooth protocol additionally supports asynchronous connection links (ACL) which are typically used to exchange data and information in non-time critical applications.

Within the piconet topology, only one Bluetooth device may typically transmit at a time. Transmissions are managed using a master/slave relationship wherein one Bluetooth device is designated as a master device and controls other slave device transmissions within the piconet. The master device coordinates transmissions within the piconet by continually polling the slave devices to determine which slave devices require a clear channel to transmit data. Slave devices receive "permission" from the master device before transmitting information and only transmit information when "asked" to do so by the master device. Controlling slave transmission traffic in this manner permits the master device to schedule and manage information exchange within the piconet and prevents data collisions and corruption due to overlapping data transmissions from multiple devices.

The aforementioned SCO link is a symmetric point-to-point link between the master device and a single slave device in the piconet. The SCO link is maintained by the master device using reserved slots or frequencies at regular intervals and typically may not be retransmitted. Therefore, interference or data corruption in SCO transmissions may not be recovered from by retransmission of data packets as is commonly used in other transmission protocols. A problem is encountered when competing or overlapping protocols, such as Bluetooth SCO transmissions, interfere with one another and result in the lack of ability to reconstruct or retransmit the data transmission after corruption or drop-off. In SCO voice transmissions, data corruption of this type may degrade the data exchange to a point where voice communication is no longer practical. As a result, a need exists for a mechanism to insure that non-retransmitable protocols which operate in a frequency-overlapping environment may be afforded a priority to insure unconflicted transmission.

In the aforementioned ACL link, a point-to-multipoint link exists between the master device and the slave devices of the piconet. Using this link type the master device may establish ACL links on a per-slot basis in those slots not reserved for SCO links to permit communication with slave devices. This link type typically supports packet retransmission and although not subject to the dramatic drop-off of transmission quality of SCO links, may still suffer undesirable performance degradation when transmitted in a conflicting manner with another frequency-overlapping protocol.

Bluetooth device communication can be further characterized by the use of a frequency-hopping spread spectrum (FHSS) technique wherein data is transmitted in discrete packets along different frequencies within the 2.4-GHz ISM band. The Bluetooth protocol specifies that frequency hops be made at the rate of approximately 1600 hops/sec such that data exchange takes place with the data spread throughout the ISM band. This type of spread spectrum (SS) technique utilizes a relatively high energy transmission along a narrow band for a limited time.

Alternatively, the WLAN wireless protocols may be used to connect electronic devices in a peer-to-peer network wherein there are no strict servers or hierarchy among communicating devices. In this network topology, each electronic device within the wireless network functions as its own server and determines when to send and receive information without a dedicated administrative server or master device. Devices in the WLAN wireless network contend for access to the available radio frequencies and bandwidth using a sensing and collision avoidance protocol to improve the rate of data and information transmission.

WLAN device communication can be further characterized by the use of a direct-sequence spread spectrum (DSSS) wherein data is transmitted along a wide bandwidth with relatively low energy. Typically, DSSS divides the available ISM band into eleven to fourteen sub-channels for different countries over the world. Each DSSS network will use a band of several channels centered at one of these standard sub-channels. In a multiple access-area network, overlapping and/or adjacent areas using different channels can operate simultaneously without interference if the distance between the center frequency is at least 30 MHz. WLAN protocols occupy these fixed channels of the ISM band, (passbands), to transmit and receive information between compatible devices.

While the aforementioned wireless protocols function well in environments where only one wireless protocol in the ISM band is in operation, a problem arises in local area networks wherein both Bluetooth and WLAN devices coexist. The shared frequency range of the two protocols inevitably results in transmission interference and data corruption as the two protocols operate with transmission frequencies that overlap at various times during routine transmission of information. The resulting frequency overlap degrades the network performance and transmission rates in both families of devices due to a lack of ability of wireless devices which use differing protocols to coordinate their data transmissions. This problem is exacerbated as the number of wireless devices within the network increases and is further affected by the proximity in which the wireless devices are placed with respect to one another. Thus, in order to prevent undue network performance degradation there is a need in the prior art for, a compensation scheme to facilitate the coexistence of shared frequency network topologies such as those used by BT and WLAN protocols.

The widespread acceptance of both the Bluetooth and WLAN wireless protocols has further lead to the manufacture of a large number of electronic devices which typically incorporate only a single wireless technology or protocol for network communication. This creates an additional problem as there are many existing wireless networks which necessarily dictate the type of wireless protocol which can be used within the network or in the vicinity of those devices in the network. Wireless devices which do not comply with the protocol of the existing wireless network may be incompatible with the network and may be precluded from use. Thus, a user may be denied access to wireless devices which cannot be integrated into the existing wireless network infrastructure because of conflicting wireless standards. In the absence of a unifying device which permits the use of more than one wireless standard in the same service area, existing wireless devices in the network may be required to be replaced with updated devices which are capable of communicating using multiple wireless standards to prevent timing and data collisions. Clearly, device replacement in this manner is undesirable as it may be prohibitively expensive and preclude the use of wireless devices which operate with differing frequency-overlapping protocols.

Based on the foregoing, a need exists for a system to facilitate the coexistence of wireless devices which operate with different frequency-overlapping protocols such as the Bluetooth and WLAN wireless protocols. A desirable feature of such a system is to permit the use of existing wireless devices without substantial modification. Furthermore, this system should manage cross-protocol trafficking to reduce collisions and interference between the wireless protocols using mixed topologies so as to permit wireless devices with differing protocols to function within the same transmission area.

SUMMARY OF THE INVENTION

The aforementioned needs are satisfied by a coordination architecture for monitoring and moderating data transmissions in wireless network where frequency-overlapping protocols coexist. In one aspect, a data collision rectification device or coordination point device receives data transmissions from one or more terminals within the network and determines transmission characteristics for each protocol. The transmission characteristics reflect timing and data throughput statistics which are used by the coordination point to determine if acceptable quality of service is maintained in the frequency-overlapping protocols. A synchronization module moderates the data transmissions as necessary to prevent data collisions and improve load balancing across the wireless network.

In another aspect, the coordination architecture is implemented using a collision avoidance method wherein transmission characteristics for the frequency-overlapping protocols are acquired and analyzed to determine if collisions in the transmission of data packets will take place. To avoid collisions between the protocols, the data exchange is prioritized and at least one of the protocols is moderated based on a coordination decision that assesses a service level for each protocol so as to maintain quality of service in both protocols.

The use of traffic assessment and load balancing methods of the present invention provides a flexible yet powerful way to insure compatibility among wireless transmission devices to improve data throughput and prevent data corruption. Furthermore, the system and methods described herein also permit the use of numerous classes of wireless devices which, until now, might be rendered incompatible due to frequency-overlapping characteristics. A further benefit of this invention is the formation of a control device which may be incorporated into an existing wireless network with mixed protocols and topologies to increase data throughput by reducing conflicting data transmissions. The methods described herein may also be integrated into new wireless device designs to add load balancing and frequency sharing functionality across multiple protocols without the need for an independent control device.

In one embodiment the invention comprises, a method for collision avoidance in a wireless communication network wherein a first subset of communications devices exchange data through transmissions using a first protocol and a second subset of communications devices exchange data through transmissions using a second protocol and wherein the transmissions occur over at least partially overlapping frequencies. This method further comprises acquiring transmission characteristics for the transmissions of the first protocol and the transmissions of the second wireless protocol and subsequently analyzing the transmission characteristics to determine an imminent collision between the transmissions of the first protocol and the transmissions of the second protocol. Imminent collisions identified by the analysis of the transmission characteristics are avoided by moderating the transmissions of at least one of the protocols.

In another embodiment the invention comprises, a method for collision avoidance in a wireless communication network wherein a first protocol and a second protocol are utilized by a plurality of communications devices to exchange data and information over at least partially overlapping frequencies. This method further comprises acquiring transmission characteristics for data packets transmitted using the first protocol and data packets transmitted using the second protocol, analyzing the transmission characteristics to determine imminent collisions in the transmission of the data packets using the first protocol and data packets transmitted using the second protocol, and moderating data exchange in at least one of the protocols to avoid imminent collisions in the transmission of the data packets using the first protocol and data packets transmitted using the second protocol.

In still another embodiment the invention comprises, a data collision rectification device for use in a wireless communication network wherein frequency-overlapping protocols comprising a first protocol and a second protocol operate to exchange information between a plurality of data transfer nodes. This device further comprises a coordination module which identifies transmission statistics during the exchange of information between the plurality of data transfer nodes and subsequently assesses the transmission statistics to determine if an acceptable quality of service is maintained and a synchronization module which moderates information exchange in at least one of the frequency-overlapping protocols to maintain acceptable quality of service.

In yet another embodiment, the invention comprises a method for assuring quality of service in a wireless communication network having a plurality of traffic types transmitted over at least partially overlapping frequencies wherein the method further comprises associating one or more service levels with each of the plurality of traffic types representative of desired quality of service ranges and associating a priority value with each of the plurality of traffic types used to rank each of the traffic types with respect to each other. The current quality of service for the traffic types is assessed and the traffic types are then ordered to maintain the desired quality of service for each traffic type within the service level. Subsequently the transmission of at least one of the plurality of traffic types is moderated to reduce collisions between the plurality of traffic types to improve the current quality of service for the traffic types.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals in which:

FIG. 7 is a chart that illustrates a traffic balancing schema used by the coordination point device.

FIG. 10 is a chart that illustrates coordination point traffic coordination instances for Bluetooth/WLAN network configurations.

DETAILED DESCRIPTION OF THE PREFERRED EMBODIMENT

Figure 1A:
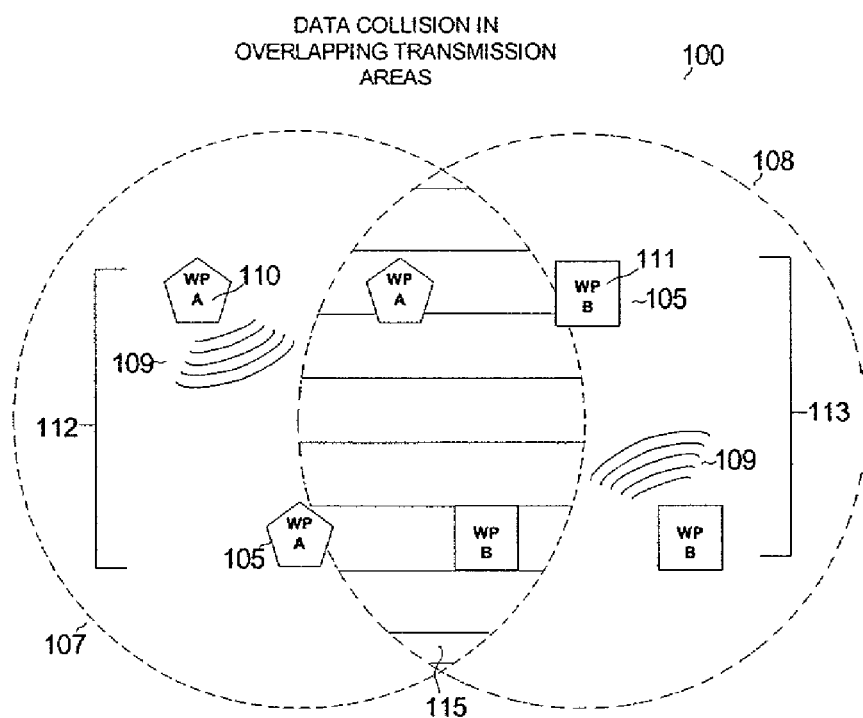
FIG. 1A is a schematic representation of a wireless network with overlapping transmission areas.

FIG. 1A illustrates an exemplary wireless network 100 wherein a plurality of wireless communication devices or data transfer terminals 105 operate within one or more access areas 107, 108. Each access area 107, 108 is further characterized by a wireless signal reception area wherein signals 109 produced by the wireless communication devices 105 may be received by other wireless communication devices 105 within the same access area 107, 108. The wireless communication devices 105 further utilize a plurality of wireless communication protocols 110, 111 wherein communication devices 105 within the same access area 107, 108 communicate with other communication devices 105 which operate using the same communication protocol 110, 111.

As shown in the illustrated embodiment, the plurality of communication devices 105 further comprises a first subset 112 of one more communication devices 105 which operate using a first wireless protocol 110 and a second subset 113 of one or more communication devices 105 which operate using a second wireless protocol 111. The nature of the wireless communication protocols 110, 111 is such that at least a portion of the wireless communication protocols 110, 111 operate in a portion of the electromagnetic spectrum wherein there is a frequency overlap between the first 110 and the second 111 communications protocol. As previously discussed, use of frequency-overlapping protocols may result in collision or interference when the protocols 110, 111 operate within the vicinity of one another. As shown in the illustrated embodiment, an interference area 115 occurs in each access area 107, 108 wherein transmissions made using the first frequency-overlapping protocol 110 coexist with transmissions made using the second frequency-overlapping protocol 111.

It will be appreciated that although the access areas 107, 108 illustrated in FIG. 1A are shown to partially overlap, the access areas 107, 108 may wholly overlap or one access area may completely cover another access area, wherein communication devices 105 which use one or more frequency-overlapping protocols 110, 111 are positioned in proximity to one another such that the access area for the frequency-overlapping protocols exists in the same spatial locality (i.e. access areas defined by identical or concentric spatial regions). In one embodiment, one access area is larger than other smaller access areas and, as a result, the larger access area can overlap with or wholly contain several smaller access areas. It will be further appreciated that the communication devices 105 may be positioned within the access areas 107, 108 such that only a portion of the devices 105 reside in the interference area 115 where the communication protocols 110, 111 overlap. The presence, however, of any communication device 105 within the region of overlap is sufficient for creating interference and collisions between the frequency-overlapping protocols 110, 111.

Figure 1B:
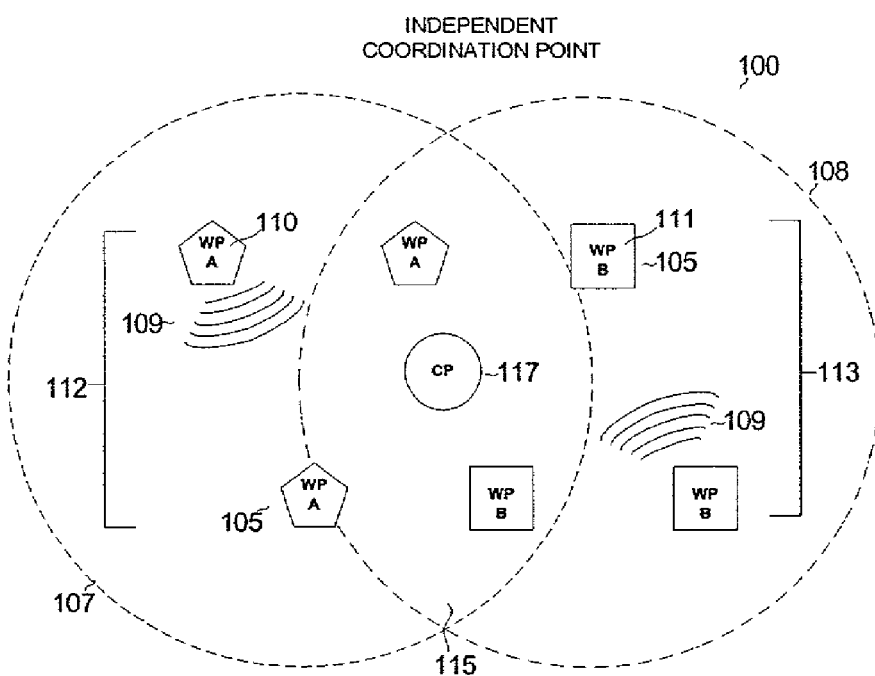
FIG. 1B is a schematic representation of a wireless network integrating a coordination point device.

FIG. 1B illustrates an embodiment of a data collision rectification device or coordination point (CP) device 117 which permits the coexistence of the wireless network 100 with frequency overlapping protocols 110, 111. In the illustrated embodiment, the CP device 117 is positioned within the interference region 115 between the two access areas 107, 108. The CP device 117 serves as a moderator for at least one of the frequency-overlapping protocols 110, 111 to permit uncorrupted data transmissions in the overlying access areas 107, 108 such that collisions and interference between the first 110 and the second 111 frequency-overlapping protocols are reduced or eliminated. The CP device 117 moderates data transmissions or signals 109 and controls the flow of data by monitoring and maintaining quality of service parameters for at least one of the protocols 110, 111 in a manner that will be discussed in greater detail hereinbelow.

In one implementation, the CP device 117 may be desirably implemented as an independent device which possess necessary functionality to moderate data transmissions 109 between the frequency-overlapping protocols 110, 111. One desirable feature of the independent CP device 117 is that it may be conveniently positioned within an existing wireless communications network 110 were data collisions and interference occur to improve data exchange and throughput. The independent CP device 117 desirably moderates data transmissions 109 between the conflicting wireless protocols 110, 111 in a manner which does not require other communication devices 105 within the network 100 to be modified or repositioned. It will be appreciated that this feature of the CP device 117 increases the flexibility and functionality of the wireless network 100 and associated wireless devices 105. Furthermore, the independent CP device 117 reduces potential costs associated with replacing existing wireless devices 105 which might otherwise interfere with each other due to their use of frequency-overlapping protocols 110, 111.

It will further be appreciated that although the CP device 117 is shown positioned in the interference region 109 of the access areas 107, 108, the CP device 117 may also be positioned elsewhere within the access areas 107, 108. For example, the CP device 117 may be positioned within the first access area 107 to moderate the first set 112 of wireless devices 105 which are associated with the first frequency-overlapping protocol 110. In this instance, network traffic flow is improved by controlling the first set 112 of wireless devices 105 whose data transfer activities are moderated to prevent collision with the second set 113 of wireless devices 105 whose data transfer activities are not moderated by the CP device 117.

Figure 2A:
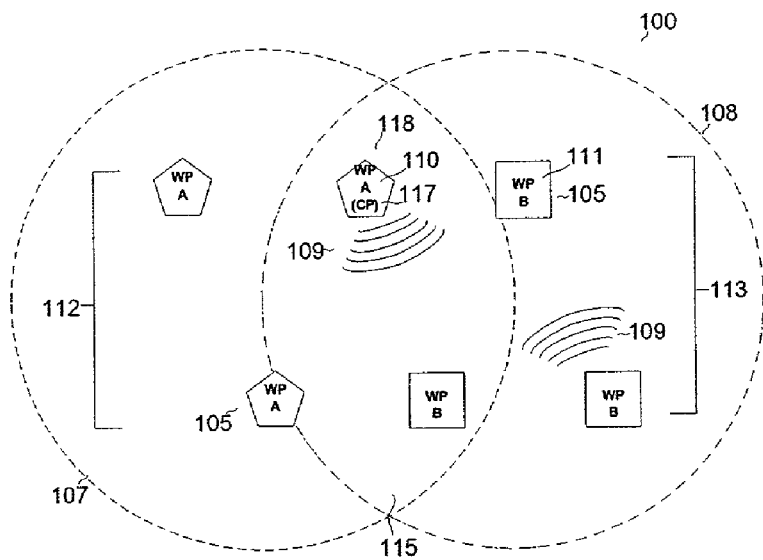
FIG. 2A is a schematic representation of a wireless network with an integrated Bluetooth coordination point device.
Figure 2B:
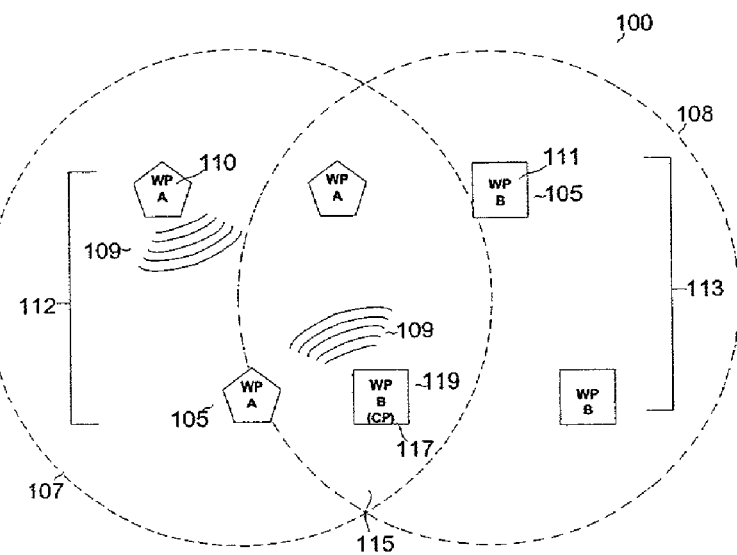
FIG. 2B is a schematic representation of a wireless network with an integrated WLAN coordination point device.
Figure 2C:
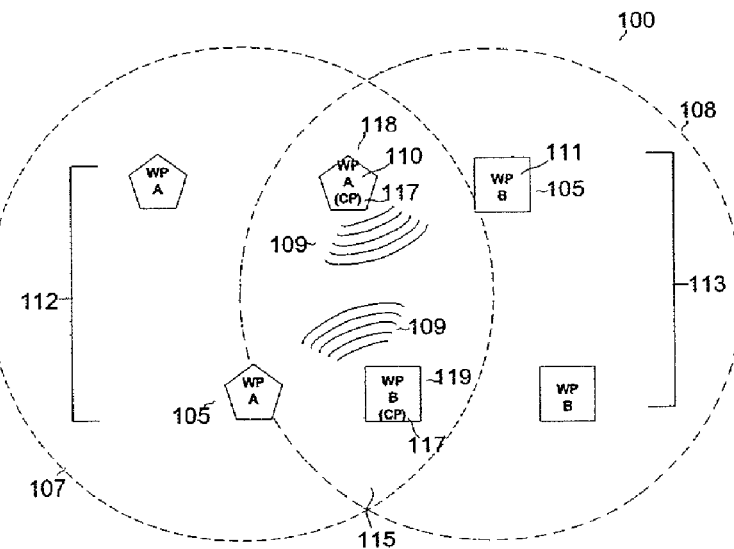
FIG. 2C is a schematic representation of a wireless network with integrated Bluetooth and WLAN coordination point devices.

FIGS. 2A–C illustrate alternative methods by which the CP device 117 may be integrated into the wireless network 100 to moderate data transfers in a least one of the frequency-overlapping protocols 110, 111. As shown in FIG. 2A the CP device 117 may be integrated into a first revised wireless device 118 which operates using the first frequency-overlapping protocol 110. In this embodiment, the first revised wireless device 118 uses its CP device 117 functionality to moderate traffic in the first set 112 of wireless devices 105 which use the first frequency overlapping protocol 110. Similar to the manner of placement of the CP device 117 shown in FIG. 1B, the first revised wireless device 118 may be positioned anywhere within the access area 107 of the first frequency-overlapping protocol 110.

FIG. 2B represents a second revised wireless device 119 which possesses an integrated CP device 117. In this embodiment, the second revised wireless device moderates traffic in the second set 113 of wireless devices 105 which use the second frequency-overlapping protocol 111.

FIG. 2C further illustrates the use of the first 118 and the second 119 revised wireless devices in a coexisting manner wherein the CP device 117 of each revised wireless device 118, 119 operates independently of one another. Control of both the first 112 and the second 113 sets of wireless devices 105 may be accomplished in this manner to more efficiently manage data traffic in the frequency-overlapping protocols 110, 111.

In each of the above-mentioned embodiments shown in FIG. 1B and FIGS. 2A–C, the first 110 and the second 111 frequency-overlapping protocols may further desirably comprise a frequency hoping spread spectrum (FHSS) protocol such as a Bluetooth (BT) protocol and a direct sequence spread spectrum (DSSS) protocol such as wireless local area network (WLAN) protocol. As described in the "Background" section, these wireless protocols posses frequency-overlapping characteristics and are subject to data collisions and attenuated data throughput resulting from the interference area 115 present between the two access areas 107, 108. Data traffic emanating from wireless devices 105 which operate in the wireless network 100 where both Bluetooth-enabled devices and WLAN-enabled devices may exist transiently experience interference between the two protocols when the transmission frequencies of these protocols overlap. It will be further appreciated that the system and methods presented herein may be applied to a network 100 where both the first and the second protocols comprise fixed frequency protocols with overlapping characteristics. Additionally a network comprising a first protocol having fixed frequency characteristics and a second protocol having alternating or shifting frequency characteristics may likewise be suitably controlled.

The above-mentioned CP device 117 is used in conjunction with a mixed network topology, such as a BT/WLAN network, to reduce collisions between the two frequency-overlapping protocols. The revised wireless communication devices 118, 119 incorporate the CP device 117 to desirably moderate data transmissions 109 of the corresponding frequency-overlapping protocols 110, 111 which they are meant to control. Furthermore, the CP devices 117 may monitor the data transmissions 109 arising from other frequency-overlapping protocols in the access area to determine if conflicting transmissions are likely to occur. The CP device 117 desirably uses a selective control method to permit the transmission of information through one protocol while another protocol and associated devices is inhibited from transmitting information to avoid collision and interference between the two protocols. In another aspect, the CP device 117 and associated methods of transmission moderation may be integrated into both protocols 110, 111. Using the CP device 117 in this manner permits monitoring and control of transmissions 109 which emanate from devices 105 which use either protocol further improving the scheduling of transmissions 109 to reduce interference and data collisions.

The following Figures illustrate an exemplary system, architecture and methods that may be used to provide CP device 117 functionality. To better describe specific and desirable implementations for this collision avoidance system, subsequent Figures will be make reference to frequency-overlapping protocols 110, 111 comprising the Bluetooth protocol and the WLAN protocol. As is known by those of skill in the art, both the Bluetooth protocol and WLAN protocol comprise numerous specifications and implementations which differ slightly from one another. For example, the WLAN protocol may further comprise IEEE 802.11 or IEEE 802.11B standards for wireless communication. It is conceived that each of these implementations and standards for wireless communication can be adapted for use with the collision avoidance system to improve data transmission in the wireless network 100. Furthermore, the collision avoidance system described herein is applicable to the wireless network 100 where wireless devices 105 use at least one of these two protocols to exchange information with other wireless devices 105 within the network 100. It will also be appreciated that although the invention is disclosed with reference to Bluetooth and WLAN protocols, other frequency-overlapping wireless protocols may readily adapted for use in the collision avoidance system and may be moderated by similar methodology. Therefore, it is conceived that the invention need not be limited with respect to the specific types of wireless protocols with which it operates.

Figure 3A:
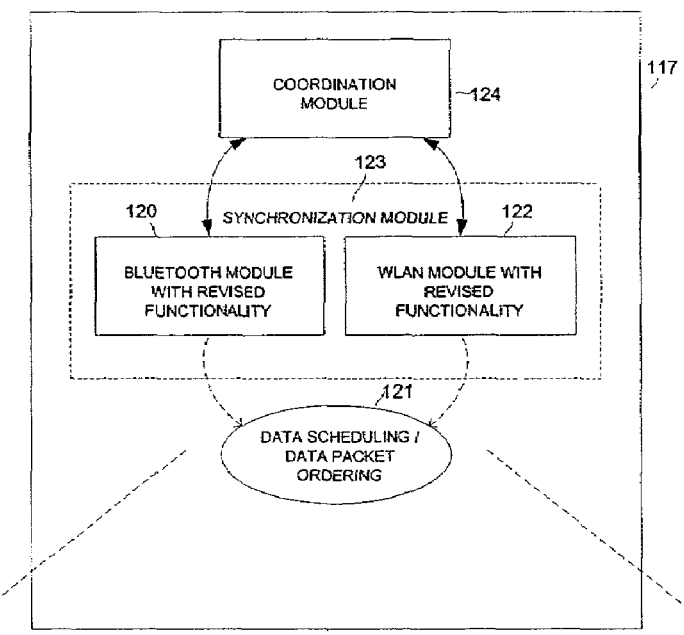
FIG. 3A is a block diagram that illustrates a coordination point device for moderating data in a wireless network comprising Bluetooth and WLAN protocols.

FIG. 3A illustrates one embodiment of a data collision rectification device or CP device 117 used to moderate data transmissions in a Bluetooth/WLAN coexisting wireless network and perform data packet ordering. As previously described and in one aspect, the CP device 117 operates as an independent device with functionality for monitoring and moderating a plurality of wireless protocols 110, 111. The CP device 117 incorporates a synchronization module 123 which handles protocol-level interactions to order and distribute information in the network. In one aspect, the synchronization module 123 comprises a revised Bluetooth (BT) module 120, a revised WLAN module 122, or a combination thereof to provide not only wireless traffic coordination but also additional functionality as a BT or WLAN enabled device. For example, the CP device 117 may additionally serve as a router or switch to permit communication devices 105 within the wireless network 100 to exchange information with a wired backbone network such as the Internet.

In each of the above-mentioned embodiments, a coordination module 124 is incorporated into the CP device 117. The coordination module 124 monitors wireless transmissions 109 within the network 100 and obtains information regarding current data transmissions. The coordination module 124 also performs functions related to data scheduling 121 by transmitting information to the wireless devices 105 within the network 100 so as to synchronize at least some of the wireless devices 105 to desirably reduce collisions and data corruption resulting from overlapping wireless transmissions. In one aspect, the coordination module 124 uses the synchronization module 123 to moderate data exchange in the wireless network 100.

As is known in the art, the architectural specifications used by the Bluetooth and WLAN protocols distinguish layers or stacks which are used to implement information exchange across the wireless network 100. Coordination of these protocols is performed by the CP device 117 which interacts with one or more of the layers of either the Bluetooth or WLAN protocol in a manner that will be described in greater detail hereinbelow.

In the Bluetooth specification the primary components of the stack include: a radio layer which defines the operational requirements of a Bluetooth-enabled device operating in the 2.4 GHz frequency; a Baseband layer which is the physical layer and acts as a link controller to manage packets and determine device status in the surrounding wireless network; a link manager protocol which configures data links, provides authentication, and communicates with other devices in the network using the same protocol; a host controller interface which provides a command interface to the Baseband layer and the link manager protocol; a logical link control and adaptation layer protocol (L2CAP) which provides connection-oriented and connectionless data services to upper-layer protocols, a RFCOMM protocol which provides emulator services for serial port devices; and a service discovery protocol (SDP) which provides functionality for the detection available services.

In the WLAN specification the primary components of the stack include: a logical link control (LLC) layer which manages data-link communication, performs link addressing, and defines service access points; a media access control layer (MAC) which handles wireless access rules and defines available network architectures; and a physical layer which defines the physical characteristics of the wireless network.

As will be appreciated by one of skill in the art, the organization and composition of the layers of the Bluetooth and WLAN protocols differ somewhat from one another, however, in each protocol basic communication functions are provided by interaction of the various layers of the protocol. For additional information regarding the Bluetooth and WLAN specifications as well as protocol stack or layer composition the reader is directed to the following references: Bluetooth Demystified, by Nathan Muller, McGraw-Hill Professional Publishing (2000) and Essential Guide to Wireless Communications Applications, The: From Cellular Systems to WAP and M-Commerce, by Andy Dornan, Prentice Hall Computer Books, (2000).

Figure 3B:
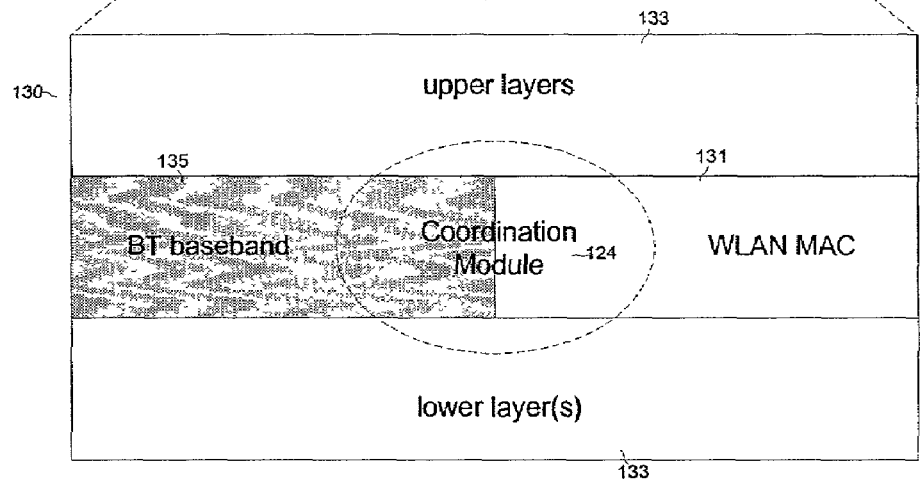
FIG. 3B is a schematic representation of a protocol architecture used by the coordination point device.

FIG. 3B illustrates a protocol architecture 130 used by the CP device 117 to avoid collisions between Bluetooth and WLAN communications protocols. In one aspect in the WLAN module 122, a Media Access Control (MAC) layer 131 is used to provide a reliable data delivery mechanism over wireless media. More specifically, the MAC layer 131 is responsible for information exchange processing where data is broken down into data packets prior to transmission. Furthermore, upon receiving packets from other wireless devices 105, the MAC layer 131 transparently reassembles the packets to be subsequently passed to other layers 133 within the architecture 130. The MAC layer 131 is additionally responsible for error checking and determining if data corruption occurs during data transfer between the wireless devices 105.

In a similar manner, in the BT module 120, a Bluetooth Baseband (BTB) layer 135 performs operations related to data exchange and error correction. Additionally, the BTB layer 135 supports different types of links between Bluetooth-enabled wireless devices 105. These links define the type of data packet which can be used by a particular link. For example, the Bluetooth specification supports a Synchronous Connection Oriented (SCO) link type and an Asynchronous Connectionless (ACL) link type. These links differ in their typical usage wherein the SCO link type is used primarily for transporting voice quality information and the ACL link type is used primarily for exchanging data quality information.

The CP device 117 and more specifically the coordination module 124 operate in conjunction with the above-mentioned MAC layer 131 and BTB layer 135 to moderate data exchange between the wireless devices 105 so as to reduce data transmission collisions when both the WLAN and BT protocols are operating in the same access area 103, 108. In one aspect, the moderation of data exchange is accomplished by ordering or sequencing the packets 121 to be transmitted by the WLAN and BT protocols such that the data transmissions of the two protocols do not take place at the same time when the frequencies of transmission of the WLAN and BT protocols overlap. Thus, a primary function of the CP device 117 is to determine a desirable ordering of the packets 121 to be transmitted across the wireless network 100. Furthermore, the CP device 117 influences the transmission of data packets in either WLAN devices, BT devices, or a combination thereof in a manner that will be discussed in greater detail hereinbelow.

Figure 4:
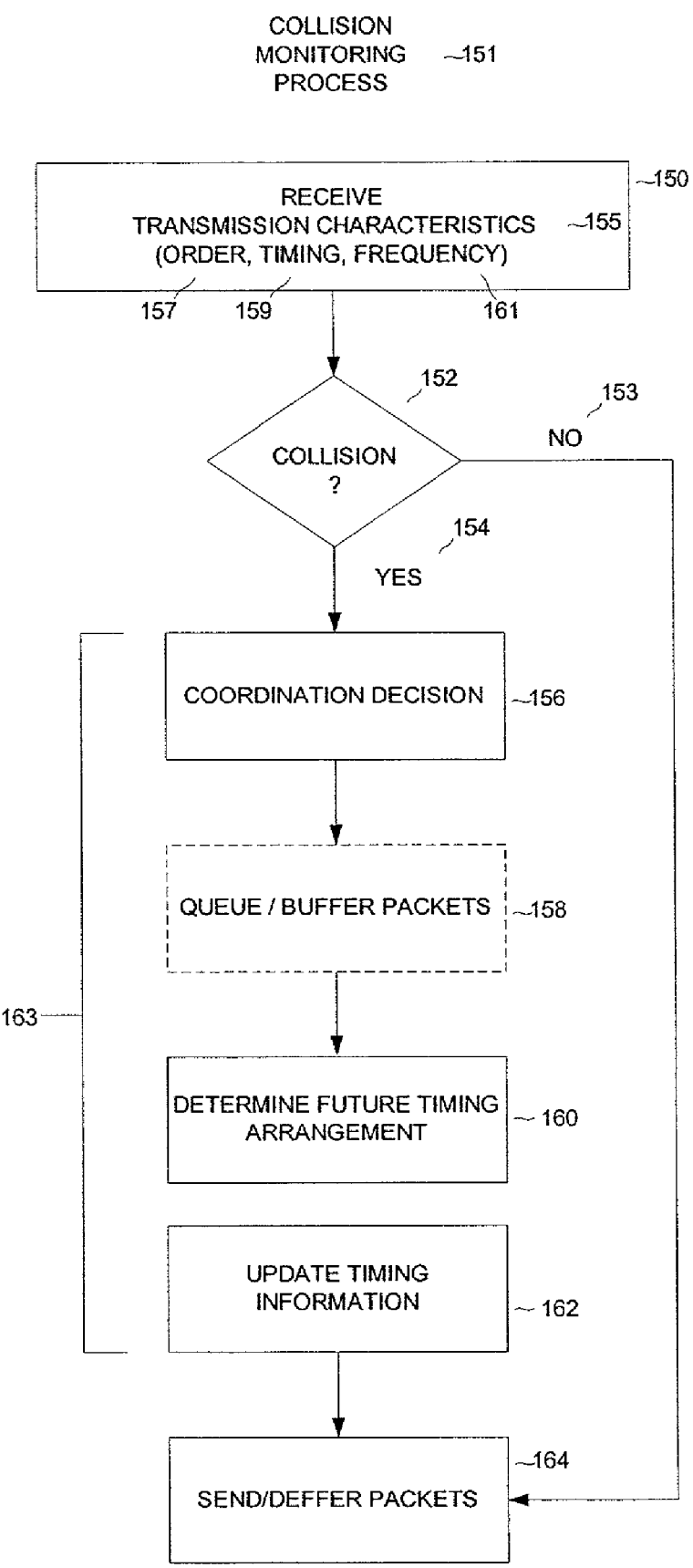
FIG. 4 is a flowchart that illustrates a collision monitoring process used by the coordination point device.

In one aspect the CP device 117 determines the ordering of the data packets 121 by acquiring timing information from previously transmitted data packets as well as, timing information from data packets that are currently being transmitted. As shown in FIG. 4, the CP device 117 receives transmission characteristics 150, including timing information 159, in a collision monitoring process 151 to reduce interference and data corruption resulting from simultaneous transmission of data packets using the WLAN and BT protocols.

The collision monitoring process 151 commences as the CP device 117 receives transmission information 150 indicative of previously and currently transmitted characteristics 155 of the data packets. The transmission characteristics 155 are typically obtained by monitoring data traffic in the wireless network 100. More specifically, the coordination module 124 polls or "listens" to information contained in the wireless transmissions made by both BT wireless devices and WLAN wireless devices to identify the transmission characteristics 155 that relate to how data packets are being transmitted. These transmission characteristics 155 include information as to the order or arrangement 157 of data packets, the timing 159 of transmission of the data packets, and the frequency or channel 161 that the data packets will be transmitted on.

Upon receiving the transmission characteristics 155, the coordination module 124 determines 152 if a collision between the frequency-overlapping protocols 110, 111 has occurred or if a collision is imminent. If the data traffic 109 in the wireless network 100 is determined not to be subject to concurrent transmissions which might cause interference 153, the coordination module 124 does not interrupt the data traffic 109 and permits BT wireless devices and WLAN wireless devices to send information without moderation. If however, a data collision or protocol interference is anticipated or detected 154, the coordination module 124 proceeds through a series of collision avoidance measures 163 designed to redirect wireless traffic in such a manner so as to prevent or minimize the data collision or interference.

Collision avoidance commences with the coordination module 124 making a determination 156 as to how to modify current and subsequent packet ordering 121 to reduce or eliminate the anticipated or detected data collision. In one aspect, the coordination module 124 contains hardware which may buffer or queue 158 the data packets to permit the temporary storage of data packets. The coordination module 124 may additionally use information contained in the buffer or queue 158 to determine ahead-of-time or future timing arrangements 160 to avoid potentially interfering data transmissions in the wireless network 100. The coordination module 124 further makes use of the buffer or queue 158 along with decoded data packet information to determine the timing and order in which packets should be transmitted 160 so as not to interfere with other data packets that are currently in a state of transmission in the wireless network 100. For example, as new packets are received by the CP device 117, the coordination unit 124 may decode a portion of the data packet corresponding to header information. The header contains transmission information such as timing and frequency of transmission characteristics which can be readily used by the coordination module 124 to schedule buffered or queued data 158 so as to prevent overlapping data transmissions.

An additional feature of the collision monitoring process enables the coordination module 124 to update timing information 162, as needed, to reschedule data packets. In updating the timing information 162 for the data packets, the coordination module 124 may also update or modify the information contained in the data packet to reflect the new timing information. For example, the coordination module 124 may modify the header information contained in the buffered or queued packets such that upon transmitting the data packets, other devices 105 within the network 100 which receive that data packets may interpret the header information to subsequently influence the data transmission characteristics of these other devices 105.

As previously mentioned, the CP device 117 may contain functionality to coordinate the data exchange in both BT and WLAN protocols through integration of the BTB layer 135 and MAC layer 131 with the coordination module 124. Using the above-mentioned steps of the collision monitoring process 151, the coordination module 124 may influence and coordinate traffic in both protocols. In this instance, the coordination module 124 determines the timing and type of traffic that is sent through each protocol and moderates traffic flow by acting as a gatekeeper for both Bluetooth and WLAN wireless transmissions in a manner that will be discussed in greater detail hereinbelow.

Figure 5:
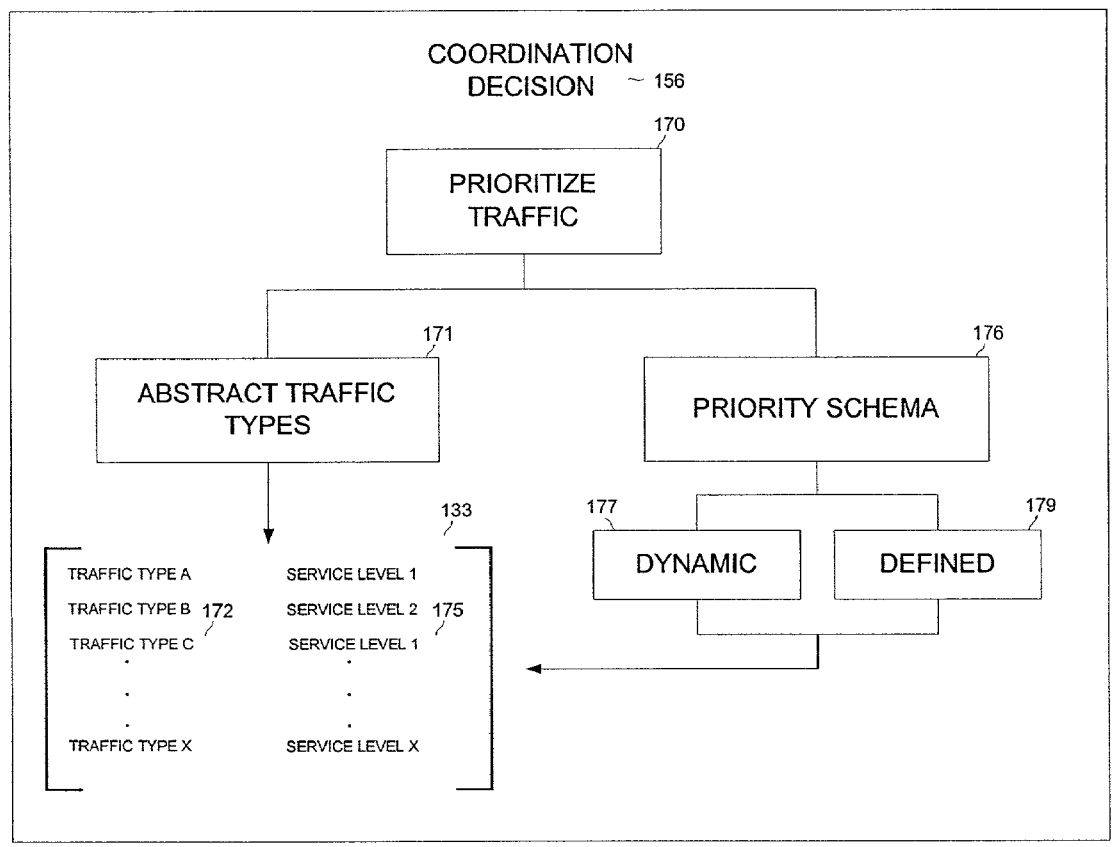
FIG. 5 is a block diagram that illustrates factors associated with a coordination decision making process.

FIG. 5 illustrates an overview of factors which are associated with the coordination decision 156 process. As previous described, a primary function of the coordination decision 156 is to prioritize traffic 170 in the wireless network 100. In one aspect, traffic prioritization 170 is accomplished using traffic type abstraction 171 to categorize potential or possible wireless transmissions into groups according to the type of protocol 172 used and a desired service level 175. In one aspect, abstraction of the traffic types is performed by categorizing the data transmissions by one or more defining characteristics rather than by identifying the traffic types 172 exclusively on the basis of the protocol itself. For example in a wireless network where BT SCO, BT ACL, and WLAN transmissions coexist, traffic type abstraction 171 may further categorize these protocols on the basis of being voice traffic or data traffic. Furthermore, voice traffic may be associated with a quality parameter or service level 175 reflecting a packet loss rate for the transmission while the data traffic may be associated with a quality parameter or service level 175 reflecting transmission delay or data throughput.

By associating the quality parameter or service level 175 with the abstract traffic type 172 an indicator of the wireless network condition can be assessed for desired categories of data transmissions rather by only protocol-dependent assessment. This feature increases the flexibility of assessing network traffic and improves the load-balancing capabilities of the CP device 117. As will be subsequently discussed in greater detail, in one implementation the service level 175 is used by CP device 117, and more specifically the coordination module 124, to determine how to moderate each traffic type 172 and balance data transmissions in the network 100.

In an another exemplary categorization, WLAN and Bluetooth protocols may comprise separate traffic types 172. Additionally, each protocol or wireless transmission may be further subdivided on the basis of the frequency or channel of operation as well as the specific transmission type within the protocol. For example, the Bluetooth protocol may be subdivided into Synchronous Connection Oriented (SCO) transmissions and Asynchronous Connectionless (ACL) transmissions. These two types of Bluetooth transmissions two may be separately identified by the coordination module 124 with each transmission type 172 assigned an independent service level or transmission profile 175.

Independent classification of the traffic types 172 permits the assignment and evaluation of individual quality requirements for each transmission type 172 which may vary depending on the intended use of the information contained in the transmission. The quality requirements may for example define the degree of degradation, latency, interference, or error correction which can be tolerated in the particular traffic type 172 when transmitted through the wireless network 100. In yet another exemplary classification, Bluetooth SCO transmissions typically associated with voice quality transmissions may have different quality requirements as compared to Bluetooth ACL transmissions which a typically associated with data quality transmissions. Furthermore, WLAN transmissions may have still other quality requirements as compared to the Bluetooth transmission types.

It will be appreciated that the traffic type abstraction 171 may be defined in numerous other ways including, but not limited to: (1) frequency or channel of transmission, (2) transmission power, and (3) speed or bandwidth requirements. Other exemplary traffic types 172 may be defined, for example, as video data, sound data, or other data types each with an estimable quality or bandwidth requirement specified. Therefore, classification of the abstract traffic types 172 desirably provides a method by which a determination can be made as to how the data traffic should be scheduled and moderated to insure the quality requirements of each traffic type 172 are met.

In conjunction with traffic type abstraction 171, a priority schema 176 further organizes the data transmissions and provides a method for efficient scheduling. The priority schema 176 recognizes the traffic types 172 and defines a rule set to be used to determine how the traffic types 172 are transmitted over the wireless network 100. This rule set comprise properties which characterize a dynamic priority 177 and a defined priority 179 which can be applied both individually and collectively to the various abstract traffic types 172.

In one aspect, traffic type abstraction 171 and the priority schema 176 are implemented in the CP device 117 as programmed or embedded logic in the coordination module 124. As will be appreciated by one of skill in the art, the characteristics which define the traffic types 172 and their associated priority schema 176 may reside within the CP device 117 in electronic circuitry comprising a programmable read-only memory device (PROM), a erasable programmable read-only memory device (EPROM), an application specific integrated circuit (ASIC), or other means of storing logic. The coordination module 124 is additionally configured to interact with the Bluetooth module 120 and WLAN module 122 to order and control wireless transmissions within the network 100 according to the aforementioned programmed logic. Thus, the interaction of the coordination module 124, the Bluetooth module 120, and the WLAN module 122 (shown in FIG. 3) provide improve load-balancing and avoid conflicts between the frequency-overlapping protocols 110, 111.

The defined priority 179 of the traffic type 172 comprises a predetermined quality of service (QOS) requirement which is desirably maintained to insure that the corresponding traffic type 172 does not experience delays, corruption, or interference which would degrade the data transmission rate of the traffic type 172 to a level below a desired performance level. In contrast, the dynamic priority 177 of the traffic types 172 comprises a continually updated QOS requirement which is based, in part, on current transmission conditions within the wireless network 100. Additionally, the dynamic priorities 177 may be based on recent and current timing information obtained by the coordination module 124. This timing information is indicative of the degree of overlap between potentially conflicting wireless protocols 110, 111 and provides a mechanism to ascertain whether data transmissions associated with the first wireless protocol 110 should be moderated to prevent interference with data transmissions from the second wireless protocol 111. The dynamic priority 177 can therefore respond to transitory changes in noise, interference, data collisions, available bandwidth, and other such factors which are associated with live traffic conditions within the network 100.

By associating both defined 179 and dynamic 177 priorities with the abstract traffic types 172, the coordination module 124 is able to make timely and efficient decisions as to how each traffic type 172 should be scheduled to reduce collisions between the frequency-overlapping protocols 110, 111. These decisions subsequently serve as the basis for the scheduling of the traffic 109 by the coordination module 124 to improve the efficiency with which data is transmitted in the wireless network 100.

Figure 6:
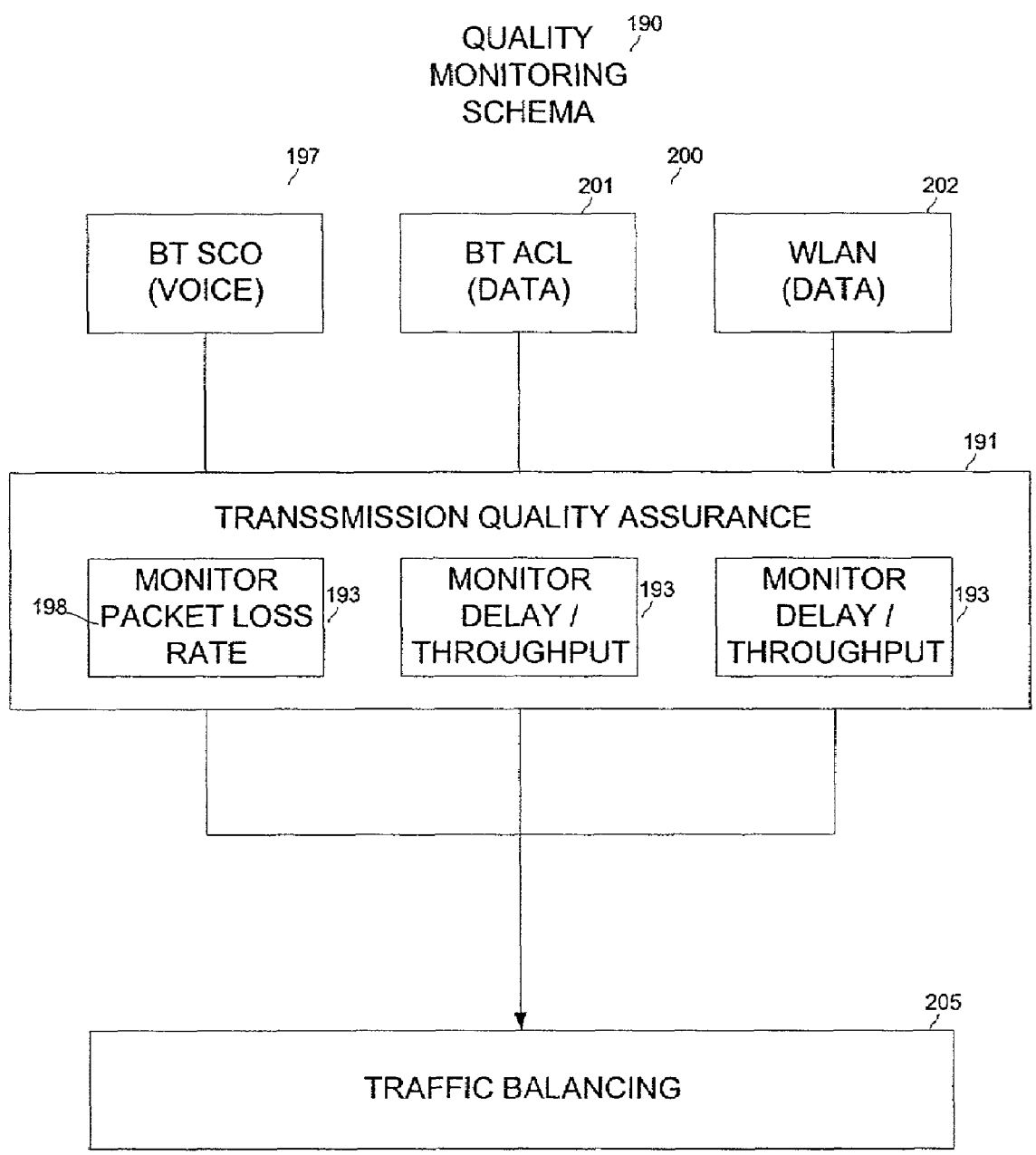
FIG. 6 is a block diagram that illustrates a quality monitoring schema used by the coordination point device.

FIG. 6 illustrates a quality monitoring schema 190 used by the coordination module 124 to balance traffic for both Bluetooth and WLAN protocols. The quality monitoring schema 190 is desirably used by the CP device 117 to monitor wireless traffic of different types 172, such as voice quality BT SCO transmissions, data quality BT ACL transmissions, and WLAN transmissions. For each traffic type 172, transmission quality assurance 191 may be performed by monitoring various transmission quality statistics 193 which are collected for each wireless traffic type 172 during transmission. Electronic logic for the quality monitoring schema 190 is embedded within the coordination module 124 so as to enable the CP device 117 to monitor data traffic in the wireless network 100 and distinguish between coexisting traffic types 172. Furthermore, the coordination module 124 may assess the service quality of each traffic type 172 and re-order or prioritize the traffic types based on the aforementioned priority schema 176.

In one aspect, the transmission quality statistics 193 which are monitored for BT SCO transmissions 197 comprise packet loss rates or statistics 198. As previously indicated, BT SCO transmissions 197 are typically associated with voice quality traffic. Packet loss rates 198 are a useful measurement which may be used to determine if BT SCO transmissions 197 meet the quality requirements necessary to maintain adequate voice quality over the wireless network 100. Voice quality transmissions 197 such as those carried BT SCO protocols must be delivered with minimal delays and without substantial data loss to maintain voice communications between users of the wireless network 100. Voice quality degradation results in a loss of clarity or quality of the transmitted voice and may further be observed by delays or latency. Live voice communication is difficult or inconvenient to conduct in a wireless network 100 where data collisions occur with high frequency because of the associated increase in the number of delays while transmitting data.

By monitoring packet loss rates, the CP device 117, may determine if competing or overlapping wireless traffic in the access areas 107, 108 negatively impacts the quality of BT SCO transmissions 197. Furthermore, the CP device 117 may influence or manipulate wireless transmissions within the network 100 to balance coexisting traffic types 172 and to provide the BT SCO transmissions 197 with a sufficiently high priority to preserve a transmission quality and reduce data collisions and packet loss.

In another aspect, the CP device 117 monitors delay and throughput characteristics for the data quality transmissions 200 such as those transmitted by BT ACL 201 and WLAN 202 protocols. The data transmissions 200 requirements of these protocols 201, 202 may be distinguished from those of voice quality transmissions 197 by differing requirements for quantities and types of acceptable delays and latency. For example, it is often permissible to transiently have a greater degree of latency in a data quality transmission 200 compared to a voice quality transmission. The CP device 117 may independently monitor the delay and throughput characteristics for each type of data transmission 197, 200 and use this information to determine how traffic balancing between frequency-overlapping protocols 110, 111 should be performed.

In one implementation, the Bluetooth module 120 and WLAN module 122 of the CP device 117 receive wireless data transmissions from wireless devices 105 in the network 100. The transmissions are subsequently processed by the coordination module 124 to identify the aforementioned delay and throughput characteristics and assess the service quality using the quality monitoring schema. The quality monitoring schema 190 provides a mechanism by which determinations may be made as to how to balance traffic in the wireless network 100 wherein the plurality of protocols 110, 111 operate. This system advantageously uses the quality monitoring schema 190 to monitor and balance 205 current data traffic conditions which may be used to identify transmissions 197, 200 which are subject to unacceptable degradation or latency. Furthermore, this schema 190 provides a mechanism to preemptively assign traffic priorities to balance data traffic in such a manner so as to reduce collisions which are likely to occur in future transmissions 197, 200.

It will be appreciated that numerous quality monitoring schemas exist which may be used to identify transmission inefficiencies and performance problems. Additionally, each protocol or transmission type may use similar or different methods of quality assessment that are appropriate to determining the transmission quality for the selected traffic type 172. Furthermore, each traffic type 172 may be subdivided into one or more subtypes of transmissions each having unique traffic priorities and/or differing methods of quality assessment. These aforementioned quality monitoring schemas are therefore conceived to be alternative embodiments of the present invention utilized by the CP device 117 to improve data throughput and reduce conflicts between the frequency-overlapping protocols 110, 111.

FIG. 7 illustrates an exemplary traffic balancing schema 210 used in conjunction with the quality monitoring schema 190 to maintain a desirable load distribution among the plurality of potentially conflicting traffic types or protocols 110, 111. In one aspect, the traffic balancing schema 210 is used to achieve desirable service levels 211 for each traffic type 172 so as to improve the flow of information in the wireless network 100.

In the exemplary traffic balancing schema 210 each traffic type 172 is associated with a basic priority value 215. The basic priority value 215 is a parameter which defines and orders the traffic types 172 to establish which traffic types 172 take precedence when a conflict occurs or is predicted by the CP device 117. As shown in the illustrated embodiment, the BT SCO traffic type 197 is assigned the basic priority 215 value of "1". This value is indicative of the BT SCO transmission 197 having the highest priority as compared to other traffic types 201, 202 which have other lesser basic priority values 215. In a similar manner, the BT ACL traffic type 201 is assigned a basic priority value 215 of "2" indicating that this traffic type has less priority than the BT SCO traffic type 197. Additionally. The WLAN traffic type 202 is assigned a basic priority value 215 of "3" indicating that this traffic type has the least priority of the any of the traffic types 216.

Each traffic type 216 is further defined by one or more service levels 211 which constitute acceptable quality of service (QOS) parameters 220. For each service level 211 the QOS parameter 220 represent characteristics which are determined to yield satisfying quality for a given traffic type 172. As shown in the illustrated embodiment, BT SCO transmissions 197 which possess a packet loss rate 221 of less than or equal to 1% are categorized by a first service level 222 indicated as "Service Level 1". Furthermore, BT SCO transmissions 197 with a packet loss rate 221 between 1% and 2.5% are categorized by a second service level 223 indicated as "Service Level 2".

In a similar manner, BT ACL transmission quality 201 is characterized by relative delay (latency) 225 and data throughput 226. The first service level 222 of the BT ACL transmissions 197 characterized by a 50 millisecond delay 225 and/or a data throughput 226 of 90%. Additionally, the second service level 223 of the BT ACL transmissions 197 is characterized by a 250 millisecond delay 225 and/or a 50% data throughput 226. Likewise, WLAN transmission quality 202 is defined by similar characteristics 220 wherein the first service level 222 of WLAN transmission 202 has a 50 millisecond delay threshold 225 and a 60% data throughput threshold 226. Furthermore, the second service level 223 of WLAN transmissions 202 are characterized by a 10% data throughput 226.

In one aspect, the service levels 211 represent statically defined characteristics useful in defining the bounds of acceptable or desirable transmission performance in the wireless network 100 where frequency-overlapping protocols 110, 111 are in use. During quality monitoring of the data traffic 109, the CP device 117 associates a current measured QOS parameter 220 with the aforementioned service levels 211 and basic priority types 215 to establish how the one or more frequency-overlapping protocols 110, 111 are performing in the wireless network 100. These service levels 211 further serve as a basis for determining how to manage and moderate data traffic 109 in the network 100 to achieve acceptable traffic balancing in the overlapping protocols 110, 111.

Figure 8:
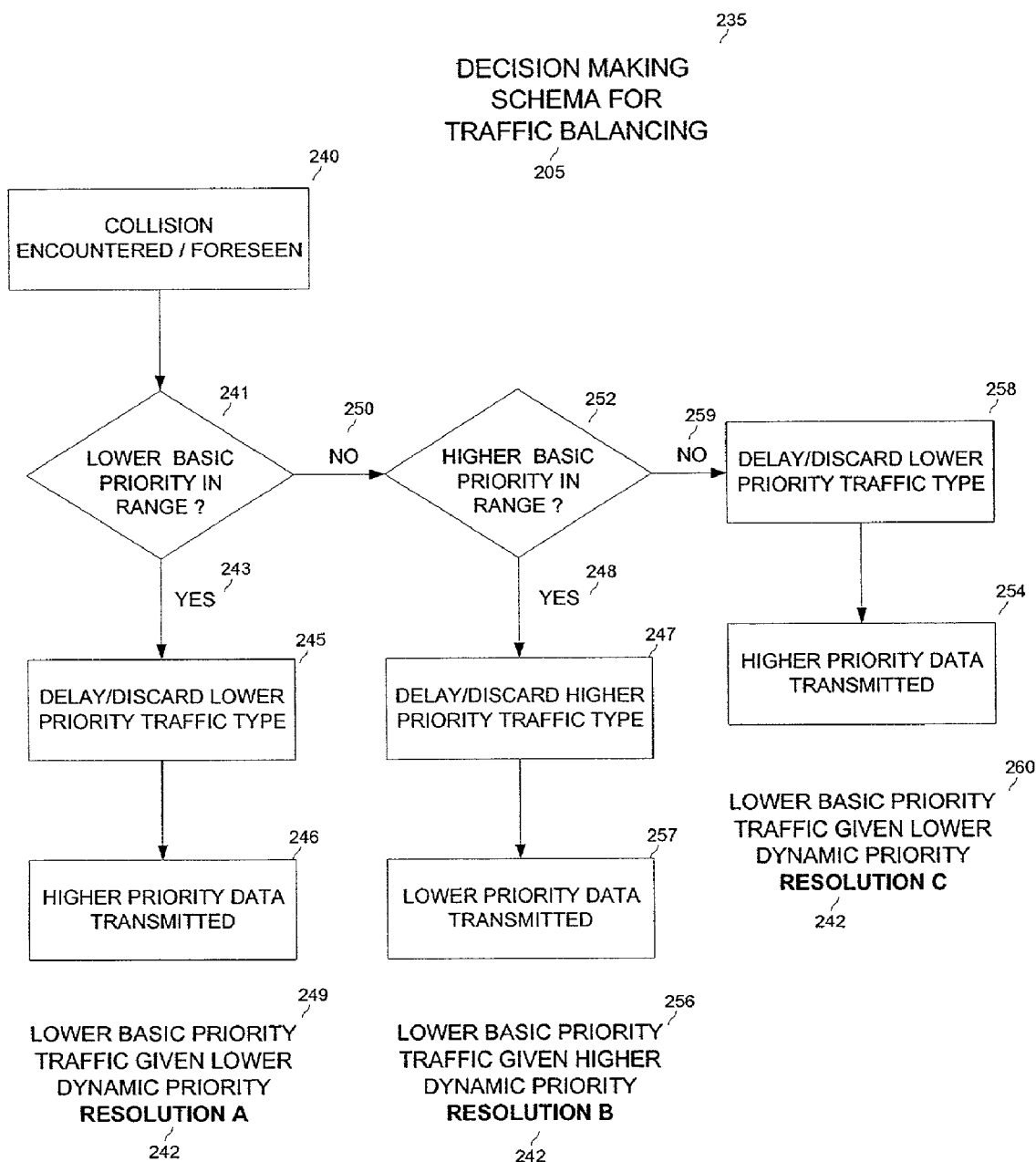
FIG. 8 is a flowchart that illustrates a decision making schema used by the coordination point device to balance traffic.

FIG. 8 illustrates one embodiment of a decision making schema 235 for traffic balancing 205 using the aforementioned QOS parameters 220 and priority values 215. When a collision is encountered or foreseen 240 the CP device 117 desirably makes a determination 241 as to which traffic type 216 should be moderated to improve data throughput. The moderation of wireless transmissions in one or more the frequency-overlapping protocols 110, 111 is defined by a series of resolutions which minimize or eliminate conflicts while attempting to maintain the QOS parameters 220. Load balancing and conflict avoidance this manner provides a beneficial feature which increases the flexibility with which the CP device 117 preserves wireless transmission quality.

Using the decision making schema 235, the CP device 117 continually monitors the current service levels 230 of each wireless transmission type to insure that desired data throughput is maintained. As conflicting transmissions between protocols 110, 111 arise, the CP device 117 routes the transmissions so as to prevent degradation below a designated threshold level. As will be discussed in greater detail hereinbelow, a method used by the CP device 117 to permit efficient routing between conflicting protocols 110, 111 is to selectively and transiently delay or discard transmissions corresponding to one or more of the wireless protocols 110, 111. Details of the methods for routing between conflicting wireless protocols are discussed in greater detail in the aforementioned copending Applications. As discussed in these copending Applications, the integrity of the data which is to be delayed or discarded may be preserved by buffering the data and/or retransmitting to restore the intended transmission at a time and/or frequency that is not in conflict with another protocol. Additionally, by delaying or discarding traffic, the CP device 117 effectively assigns a dynamic priority 247 to at least one of the conflicting transmissions.

In the decision making schema 235, the determination 241 of the ordering of the conflicting transmissions comprises identifying the priority values 215 for each of the conflicting transmissions and determining if the transmission with the lower basic priority 215 will be in a desired service level 211 at the time of the collision. If the transmission with the lower basic priority 215 is within the desired service level 211, then the CP device 117 may delay or discard a portion of the lower priority traffic 245 type and allow transmission of the higher priority traffic type 246 without conflict.

Thus, a first resolution 249 (Resolution A) useful in avoiding conflict in the frequency-overlapping protocols lowers the dynamic priority of the lower basic priority traffic. The lowering of dynamic priority desirably permits higher priority traffic to be transmitted with reduced conflict so as to maintain the current service 230 within the desired service level parameters 211.

If the CP device 117 determines that the lower basic priority traffic 245 is not in range 250 or if the lower basic priority traffic degrades out of range due to lowering of dynamic priority by Resolution A 249, the CP device 117 may proceed to subsequent determination step 252 where the traffic 109 with the higher basic priority is assessed. If the higher basic priority traffic is in range 248, the CP device 117 may delay or discard a portion of the higher priority traffic type 247 permitting unconflicted transmission 257 of the lower basic priority traffic. Thus in Resolution B 256, lower basic priority traffic is given a higher dynamic priority to insure that current service for each traffic type remains within desired service levels 211.

If the higher basic priority traffic is found to be out of range 259, the decision making schema 235 proceeds to a stage where the lower priority traffic type is given a lower dynamic priority 260 (Resolution C). In this stage, the CP device 117 attempts to maintain the higher basic priority traffic within the desired service level 211 by delaying or discarding a portion of the lower priority traffic type 258 and transmitting the higher priority data 254. As a result, the lower basic priority traffic may transiently fall below the desired service level 211 to accommodate an increased data throughput in the higher priority traffic.

The aforementioned steps of the decision making schema used by the CP device 117 insure that wireless traffic 109 will continue to flow while at the same time attempting to maintain QOS levels 220 for all traffic types. In collisions where at least one of the wireless transmission protocols 110, 111 will degrade out of QOS levels 220, the CP device 117 attempts to moderate lower basic priority transmissions to insure data transmissions with the higher basic priority are sent with improved data throughput.

It will be appreciated that the decision making schema 235 shown is but one of many possible embodiments of suitable methods for moderating a plurality of wireless data transmissions using the CP device 117. It is conceived that other suitable decision making paths may be devised with similarly perform desirable load balancing functions while improving data throughput. For example, in the decision making schema 235, in addition to resolving data conflicts by assigning dynamic priorities, the CP device 117 may also recognize a plurality of service levels 211 for each traffic type 216 and integrate a service level switching routine into the decision making schema 235 to provide other resolution options. The service level switching routine desirably allows the CP device 117 to recognize a plurality of service levels 220 which may be assigned to the traffic types 216 in a manner dependent on the network capacity or load. As such, alternative decision making schemas, resolutions, service levels or any combination therefore are recognized as but other embodiments of the present invention.

Figure 9:
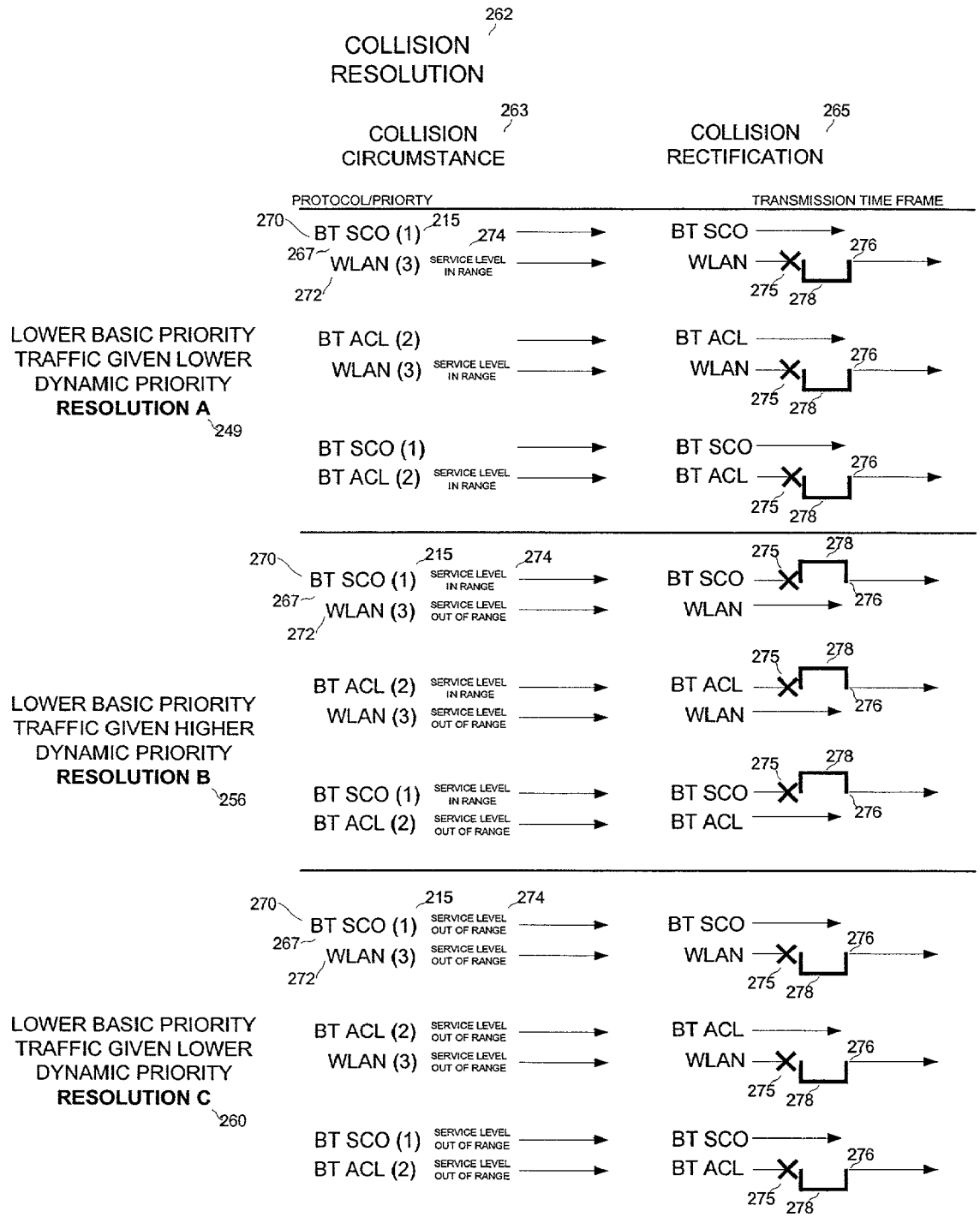
FIG. 9 is a chart that illustrates Bluetooth/WLAN collision resolutions using the coordination point device.

FIG. 9 further illustrates methods of collision resolution used in the aforementioned decision making schema 235 for traffic balancing. In a wireless network 100 comprising Bluetooth and WLAN transmissions a number of collision circumstances 263 may arise. Using the basic priority values 215 previously illustrated in FIG. 7, each collision circumstance 263 is illustrated as a pair of potentially conflicting protocols 267. A collision rectification solution 265 based on the resolution type 249, 256, 260 is further illustrated to indicate how the conflict may be resolved.

For Resolution A type collisions 249, a first colliding protocol 270 is illustrated as having a higher basic priority 215 than a second colliding protocol 272. Furthermore, the second colliding protocol 272 is exemplified as operating within a desirable service level 274. Based on a collision model involving Bluetooth and WLAN protocols, possible collision circumstances may include BT SCO/WLAN, BT ACL/WLAN, and BT SCO/BT ACL overlapping transmissions. In each circumstance, the second colliding protocol 272 is delayed or a portion discarded 275 and subsequently retransmitted 276 to provide an open transmission window 278 for the first colliding protocol 270. The time frame of the delay or discard 275 provides enough time for the first protocol 270 to transmit the required data without overlap with the second protocol 272. After a suitable length of time has elapsed, the second protocol 272 is resumed 276 such that the two transmissions 270, 272 are sequentially transmitted in a non-frequency-overlapping manner.

As shown in the illustrated embodiment, for Resolution A type collisions 249, WLAN transmissions will be moderated to permit Bluetooth transmissions (SCO and ACL) to proceed. In the case of conflicting Bluetooth transmissions, BT SCO transmissions will take precedence over BT ACL transmissions.

In a similar manner, Resolution B type collisions 256 are characterized by the first colliding protocol 270 having a higher basic priority 215 than the second colliding protocol 272. Furthermore, the first colliding protocol 270 is characterized as being within acceptable service level parameters 274 while the second colliding protocol 272 is operating below the desired service level range 274. In this circumstance, the first protocol 270 is deferred 275 to permit the second protocol 272 to proceed in the open transmission window 278 so as to improve the service level 274 of the second protocol and prevent further degradation of its current service 230. This resolution 256 maintains desirable data throughput and QOS parameters 220 as the first protocol 270 may be partially degraded and still operate within the desired service level 211. The first protocol transmission 270 is subsequently resumed 276 when the likelihood of collision has diminished to provide sequential rather than overlapping transmission in the frequency-overlapping protocols 110, 111.

Therefore, for Resolution B type collisions 256, Bluetooth transmissions (SCO and ACL) are moderated to permit WLAN transmissions to proceed. In the case of conflicting Bluetooth transmissions, BT ACL transmissions will take precedence over BT SCO transmissions.

In Resolution C type collisions 260 both the first 270 and the second 272 frequency-overlapping protocols operate below the desired service level 274. In this circumstance it is desirable to improve data throughput in the protocol with the highest basic priority 215 in an attempt to preserve communication efficiency in at least one of the conflicting protocols 270, 272 even though desired service level performance 274 may not be achievable. As shown in FIG. 8, WLAN transmissions are moderated 275 to permit Bluetooth transmissions to proceed without conflict in the open transmission window 278 with WLAN transmissions being subsequently resumed 276 when the potential for conflict has been avoided. In a similar manner, conflicting Bluetooth transmissions are ordered such that BT ACL transmissions are delayed with BT SCO transmissions proceeding umnoderated.

As is known in the art of wireless networking, Bluetooth wireless devices may operate using a master/slave hierarchy. In this architecture a single Bluetooth master device coordinates the data transmission activities of one or more Bluetooth slave devices. Furthermore, Bluetooth slave devices are responsive to commands issued by the Bluetooth master device and transmit data in accordance with permissions granted by the Bluetooth master device. Using this approach to data traffic coordination provides a centralized method by which wireless data transmissions can be controlled so that the individual devices of the network can exchange information.

Conversely, in a WLAN network each device operates in a peer-to-peer manner where there are no dedicated server or hierarchy among devices. In a peer-to-peer network each wireless device functions as its own server with no administrative devices dedicated to controlling network traffic. Instead each WLAN device communicates with other devices in the network to determine when data transmissions may be sent without conflict with other transmissions from other WLAN devices.

The aforementioned differences between the Bluetooth and WLAN network protocols affect the type of control or management functionality which can be exerted by the CP device 117. As will be discussed in greater detail hereinbelow the manner in which the CP device 117 is configured may influence the manner of control, as well as the protocol 110, 111 which is influenced by the CP device 117.

FIG. 10 illustrates a protocol control table 300 for a CP device 117 that moderates data collisions between Bluetooth and WLAN protocols. The control table 300 defines functional categories that the CP device 117 operates in with reference to both the Bluetooth and WLAN protocols. It is conceived that the CP device 117 may possess functionality to control Bluetooth protocols, WLAN protocols, or a combination of both protocols. Collision avoidance is achieved by monitoring each frequency-overlapping protocol and controlling data transmissions in one or more moderated protocols 305 to prevent data collisions or interference. Protocol control can thus be administered in a number of different ways to minimize or eliminate data collisions in the wireless network 100.

A first class 310 of CP device 117 may operate by moderating only WLAN traffic. An exemplary CP device 117 of this class 310 comprises a WLAN unit or component with integrated coordination functionality that moderates WLAN transmissions throughout the wireless network 100. As described above, the peer-to-peer mode of operation of WLAN devices permits the CP device 117 to readily influence data transmissions through the WLAN protocol 315. In one aspect, the CP device 117 may influence the WLAN data traffic by deferring packet transmissions or transmitting jamming signals which transiently interrupt the flow of WLAN traffic, details of which are provided in the aforementioned copending Applications.

During the time in which the WLAN traffic is interrupted, potentially conflicting Bluetooth traffic may be transmitted throughout the wireless network 100 without colliding with the frequency-overlapping WLAN traffic. When the traffic conflict has been resolved, the WLAN transmissions may again be resumed by the CP device 117. Moderation of the WLAN traffic in this manner is desirably performed in accordance with the service level parameters 211 set forth in the traffic balancing schema (FIG. 7) and the decision making schema (FIG. 8).

Another class 320 of CP device 117 may operate by moderating Bluetooth traffic. An exemplary CP device 117 of this class 320 comprises a Bluetooth unit or component with integrated coordination functionality to moderate Bluetooth transmissions throughout the wireless network 100. In one aspect, a subclass 330 CP device 117 comprises a Bluetooth master component 327. The Bluetooth master component 327 moderates data traffic throughout the Bluetooth network in a similar manner as described for WLAN traffic moderation. A CP device 117 with integrated Bluetooth master functionality 330 may moderate both incoming and outgoing transmissions in individual BT devices to prevent data conflicts. Furthermore, the CP device 117 with Bluetooth master functionality 330 will have the ability to moderate both BT SCO transmissions 201 and BT ACL transmissions 202. Load balancing is desirably performed for both BT transmission types using the aforementioned service level parameters 211.

In another aspect, a subclass 340 CP device 117 may comprise a Bluetooth component with Bluetooth slave functionality 329. The CP device 117 of this class 340 controls only Bluetooth data transmissions which emanate from the CP device 117 itself and may have limited ability to moderate Bluetooth data transmissions throughout the network 100. Although the CP device 117 with Bluetooth slave functionality 340 does not exert the same degree of control as the CP device 117 with Bluetooth master functionality 330, this class of device 340 may be desirably integrated into existing Bluetooth networks where a Bluetooth master device has already been assigned thus increasing the flexibility of integrating the CP device 117 into existing networks.

In each of the abovementioned CP devices 117 a combination of WLAN and Bluetooth component functionalities moderate both protocols simultaneously 110, 111. Moderation of both protocols desirably provides a greater level of control and permits the CP device 117 to effectively manage both protocols to insure that service level constraints are met. Furthermore, dual-protocol configuration of CP device 117 takes full advantage of the multi-resolution decision making schema (FIG. 8) to provide for efficient traffic balancing and traffic avoidance. It is however conceived that the CP device 117 may only exert moderation control in a single protocol 110, 111. The single protocol configuration of CP device 117 is still able to effectively moderate data traffic to prevent data collisions or interference which degrades data throughput.

In the development of numerous wireless communication standards, incorporation of the traffic assessment and load balancing schemas represent flexible yet powerful way to insure compatibility among devices to improve data throughput and prevent undesirable data corruption and network latency. Coordination of frequency-overlapping protocols using the aforementioned system and methods desirably permits the use of numerous classes of wireless devices which were until now incompatible with one another. A further benefit of this invention is the formation of a control device which may be incorporated into an existing wireless network with mixed protocols and topologies to increase data throughput by reducing conflicting data transmissions. The methods described herein may also be integrated into new wireless device designs to add load balancing and frequency sharing functionality across multiple protocols without the need for an independent control device.

Although the foregoing description of the invention has shown, described and pointed out novel features of the invention, it will be understood that various omissions, substitutions, and changes in the form of the detail of the apparatus as illustrated, as well as the uses thereof, may be made by those skilled in the art without departing from the spirit of the present invention. Consequently the scope of the invention should not be limited to the foregoing discussion but should be defined by the appended claims.

What is claimed is:

1. A data collision rectification device for use in a wireless communication network wherein data transmissions using frequency-overlapping protocols comprising a first protocol and a second protocol operate to exchange information between a plurality of data transfer nodes, the device comprising:
    a coordination module which determines first and second transmission priorities associated with a first data transmission using the first protocol and a second data transmission using the second protocol, respectively; and determines a first current quality of service of the first transmission and a second current quality of service of the second transmission; and
    a synchronization module which moderates the first transmission in response to determining that (1) the first transmission priority is higher than the second transmission priority, (2) the second current quality of service is not within an acceptable quality of service range for transmissions using the second protocol, and (3) the first current quality of service is within an acceptable quality of service range for transmissions using the first protocol.

2. The device of claim 1, wherein the synchronization module moderates the second transmission in response to determining that (1) the second transmission priority is lower than the first transmission priority and (2) the second current quality of service is within an acceptable quality of service range for transmissions using the second protocol.

3. The device of claim 2, wherein the first current quality of service and the second current quality of service are determined by assessing one or more transmission characteristics of respective first and second transmissions.

4. The device of claim 2, wherein at least one of the first and second transmissions comprises voice data.

5. The device of claim 2, wherein the first and second quality of service ranges each comprise one or more ranges of acceptable values for different quality of service metrics.

6. The device of claim 2, wherein the synchronization module moderates the traffic types to maintain acceptable quality of service.

7. The device of claim 1, wherein at least one of the frequency-overlapping protocols comprises a frequency-hopping spread spectrum (FHSS) protocol.

8. The device of claim 7 wherein the FHSS protocol further comprises a Bluetooth protocol.

9. The device of claim 1, wherein at least one of the frequency-overlapping protocols comprises a direct sequence spread spectrum (DSSS) protocol.

10. The device of claim 9, wherein the DSSS protocol comprises an IEEE 802.11 DSSS protocol or an IEEE 802.11b DSSS protocol.

11. The device of claim 1, wherein the frequency-overlapping protocols comprise fixed-frequency protocols or alternating-frequency protocols.

12. A method of moderating transmission of data in a communication network, wherein a first device transmits a first transmission using a first protocol and a second device transmits a second transmission using a second protocol, the first and second protocols being associated with respective first and second priorities, wherein the first priority is higher than the second priority, the method comprising:
    determining first and second quality of services ranges associated with respective first and second protocols;
    monitoring a first current quality of service level of the first transmission and a second current quality of service level of the second transmission, wherein the first and second current quality of service levels are continuously updated during transmission of the first and second transmissions;
    in response to detecting a collision between the first and second transmissions, moderating one of the first and second transmissions in the following manner:
        moderating the second transmission in response to determining that the second current quality of service level is within the second quality of service range;
        moderating the first transmission in response to determining that (1) the second current quality of service level is not within the second quality of service range and (2) the first current quality of service level is within the first quality of service range; and
        moderating the first transmission in response to determining that (1) the second current quality of service level is not within the second quality of service range and (2) the first current quality of service level is not within the second quality of service level.

* * * * *